United States Patent
Hurwitz

(10) Patent No.: US 7,694,687 B2
(45) Date of Patent: *Apr. 13, 2010

(54) DIRECT APPLICATION BRUSH FOR HORSES AND LIVESTOCK THAT RELEASES ACTIVE INGREDIENTS

(75) Inventor: Marni Markell Hurwitz, Far Hills, NJ (US)

(73) Assignee: I Didit, Inc, Far Hills, NJ (US)

( * ) Notice: Subject to any disclaimer, the term of this patent is extended or adjusted under 35 U.S.C. 154(b) by 354 days.

This patent is subject to a terminal disclaimer.

(21) Appl. No.: 11/710,848

(22) Filed: Feb. 26, 2007

(65) Prior Publication Data

US 2007/0144451 A1 Jun. 28, 2007

Related U.S. Application Data

(63) Continuation-in-part of application No. 11/349,638, filed on Feb. 8, 2006, now Pat. No. 7,322,364, which is a continuation-in-part of application No. 11/186,583, filed on Jul. 21, 2005, now Pat. No. 7,337,784.

(51) Int. Cl.
*A45D 24/22* (2006.01)
*A45D 24/16* (2006.01)
*A46B 7/00* (2006.01)

(52) U.S. Cl. .......................... 132/112; 132/108; 15/186
(58) Field of Classification Search ......... 132/112–116; 401/184
See application file for complete search history.

(56) References Cited

U.S. PATENT DOCUMENTS

| | | | |
|---|---|---|---|
| 1,501,089 A * | 7/1924 | Andrews | 401/28 |
| 2,162,907 A * | 6/1939 | Bambach | 401/28 |
| 2,952,027 A * | 9/1960 | Caldwell | 401/28 |
| 4,244,076 A | 1/1981 | Meyer | 15/188 |
| 5,150,491 A | 9/1992 | Ikemoto | 15/1.52 |
| 5,261,426 A | 11/1993 | Kellett et al. | 132/108 |
| 5,626,099 A | 5/1997 | Staller et al. | 119/625 |
| 5,762,433 A * | 6/1998 | Cary | 401/184 |
| 6,450,127 B2 | 9/2002 | Willinger et al. | 119/663 |
| 6,543,388 B2 | 4/2003 | Willinger et al. | 119/663 |
| 6,575,174 B2 | 6/2003 | Lee | 132/160 |
| 6,618,893 B1 * | 9/2003 | Wang | 15/186 |
| 7,322,364 B2 * | 1/2008 | Hurwitz | 132/116 |
| 7,337,784 B2 * | 3/2008 | Hurwitz | 132/116 |

\* cited by examiner

*Primary Examiner*—Robyn Doan
(74) *Attorney, Agent, or Firm*—Ernest D. Buff & Associates, LLC; Ernest D. Buff; Harry Anagnostopoulous

(57) ABSTRACT

A horse and/or livestock brush releases a liquid gel solution directly onto the coat of an animal during brushing. Delivery of the liquid gel solution is activated by manually depressing the brushes cover. The liquid gel solution includes perfumes, fragrances and other active compositions including insect repellant, hair conditioners, dyes, moisturizers, or antibacterial compounds. The brush includes a flexible deformable membrane with a plurality of apertures that are, optionally, aligned with apertures in brush bristles for delivery of the liquid gel active composition, and is fitted within a first opening of an internal cavity in a brush base. A porous sponge saturated with the liquid gel active ingredient is inserted over the flexible deformable membrane. A cover is inserted through a second opening and rests upon the porous sponge. Brushing action deforms the flexible deformable membrane and squeezes the sponge, releasing the active ingredient during brushing or when the cover is depressed manually.

18 Claims, 5 Drawing Sheets

DIRECT APPLICATION BRUSH FOR HORSES AND LIVESTOCK THAT RELEASES ACTIVE INGREDIENTS

This is a Continuation-In-Part of application Ser. No. 11/349,638, filed Feb. 8, 2006, now U.S. Pat. No. 7,322,364 for "Hairbrush for Pets and People that Releases Active Ingredients", which in turn is a Continuation-In-Part of application Ser. No. 11/186,583, filed Jul. 21, 2005, now U.S. Pat. No. 7,337,784 for "Hairbrush for Pets and People that Releases Active Ingredients", the disclosures of which are hereby incorporated in their entirety by reference thereto.

BACKGROUND OF THE INVENTION

1. Field of the Invention

The present invention relates to a direct application brush for horses and livestock; and more specifically to a hairbrush which, during brushing, releases active ingredients, such as therapeutic or moisturizing compounds, antibacterial compounds, insect repellant, flea and/or tic compounds, hair-conditioning and detangle products, sun protection lotions, mane and tail whiteners and stain removers, dye compositions, fragrances or other hair-related products.

2. Description of the Prior Art

Many patents address issues related to brush designs having a number of bristles adapted to provide desired brushing action. Brushes for pets, horses and livestock typically incorporate harsh bristles, while those for humans are typically provided with softer bristles. Several patents disclose coating bristles with desired compositions in order to deliver these compositions to the brushed hair.

U.S. Pat. No. 4,244,076 to Meyer discloses a method and forming tool for the fabrication of a bristle support for a brush, especially a brush. The method involves attaching pin-like bristles to a bristle support or carrier for a hairbrush. In a first step the rows of bristle pins are interconnected with one another at their rear end by means of a web. The individual bristle pin rows are retained in their position by the web. In a next step the bristle pins, at the region of their rear ends, together with the webs, are cast in the material of the bristle support, so that the bristle pin rows are embedded in the bristle support. In this method, the bristle pins are molded into a cast support that is rigid and solid and therefore is incapable of delivering perfume or other active compositions to the hair or fur being brushed.

U.S. Pat. No. 5,150,491 to Ikemoto discloses a hairbrush adapted to prevent static charging of the bristles and hair. It has a multiplicity of small holes formed in a conductive brush base that carries a row of antistatic members. The antistatic members are relatively stiff. They are prevented from bending down, and render the brush easy to draw through hair, thereby facilitating smooth brushing. The conductive brush base is solid. It cannot deliver perfume or other active compositions to hair or fur, but merely eliminates the static present in the hair and bristles by conducting charges that are present.

U.S. Pat. No. 5,261,426 to Kellett, et al. discloses a hydrophilic foam pad for hair styling. The hair conditioning and styling pad has a shaped body of a resilient, open-celled, hydrophilic polyurethane foam matrix integrally incorporating an aqueous phase incorporating about 70-90% water, about 5-25% of a hair conditioning agent, and a nonionic surfactant. The bristles or tines of a brush contact the resilient pad and transfer the aqueous hair styling composition to the brush so that the composition is subsequently transferred to the hair as it is being styled. This styling device requires periodic contact with the resilient pad to recharge the bristles, and does not by itself deliver perfume or other active compositions to hair or fur.

U.S. Pat. No. 5,626,099 to Staller, et al. discloses a therapeutic groomer. This hand-held grooming device grooms, massages, and provides magnetic therapy for animals. The device has a base that is configured to be hand-held. On the base, there is formed a grooming pad having projections adapted for grooming and massaging. The grooming pads are formed by either a plurality of parallely arranged strips, each having magnetic properties, or a single magnetic sheet. Each strip has its magnetic poles aligned uniformly so that its longitudinal ends are polar opposites. The therapeutic groomer does not deliver perfume or active compositions to the hair or fur being groomed.

U.S. Pat. Nos. 6,450,127 and 6,543,388 to Willinger, et al. disclose an ergonomic handle for a grooming brush. This brush handle is formed with a continuously arched upper surface portion and a lower surface portion separated by a humped semicircular ridge. One of the lower arched portions forms a trigger grip for a single finger held in either a forehand or backhand grip. The handle is covered with a high friction material in the form of a contoured rubber or elastomeric sleeve, which is stretched over a molded plastic handle. These patents relate only to the shape of a handle of a hairbrush and do not disclose a brush that delivers perfumes or other active ingredients to brushed hair or fur.

A hairbrush commercially marketed by JW Pet Company (Hasbrouck Heights, N.J.) incorporates an ergonomic handle disclosed in U.S. Pat. Nos. 6,450,127 and 6,543,388. It uses a polymeric molded closed elliptical cavity which includes a thick elliptical rubber element carrying multitudes of metallic bristle pins with rounded tips. The distal end of the bristle pins opposed to the rounded tips carries nail heads, which rests against and are glued to a thick rubber element using rubber cement or similar glue. The bristle pins in the rubber element form an air leak-tight seal. The elliptical rubber element has a single hole appointed for discharging air. This elliptical rubber element with attached pins is squeezed into the closed elliptical cavity of a polymeric molded brush and the rubber element adopts a concave shape with the pins sticking out in a non-planar configuration. During use, pressure is applied to the pins in the middle portion of the elliptical rubber element of the brush. The air entrapped in the cavity formed by the rubber element and elliptical cavity is squeezed by the pressure applied, thereby providing a springy feel, while the entrapped air is released through the single hole present in the elliptical rubber element. This brush has a single air outlet and discharges air entrapped in the elliptical cavity of the brush. It has no means available for delivering a perfume or other active ingredients to the brushed hair or fur.

U.S. Pat. No. 6,575,174 to Lee discloses a hair grooming brush having a plurality of rows of curved wavy bristles, rather than traditional straight bristles commonly found on brushes and combs. The curvature of the bristles produces springiness to the bristles when pressure is applied during the combing action. The springiness of the numerous rows of bristles translates into a massaging effect upon the hair and scalp. These springy bristles do not deliver perfumes or other active compositions to the hair or fur being brushed.

There remains a need in the art for an easy to use brush for grooming horses and livestock that delivers one or more active ingredients, such as perfume or other active compositions to the hair, mane, and fur of these animals. Also needed is a brush that releases perfume or other active compositions continuously during brushing, and releases additional perfume on demand.

SUMMARY OF THE INVENTION

The present invention discloses a lightweight brush with a brush base having an internal cavity with a bottom surface having a first opening and a top surface having a second opening, respectively. The first cavity opening is located on the bottom surface of the brush base, facing the bristles of the brush. The second cavity opening is located on the top surface of the brush base, opposed to the bristles. A flexible, deformable membrane having a plurality of apertures, preferably made from rubber, carries a multitude of bristles inserted through the apertures in the flexible deformable membrane. Each bristle is provided with a central aperture and optionally a slit along the length of the bristle. The central aperture is aligned with the aperture in the flexible deformable membrane so that a continuous liquid gel delivery path is provided. The edges of the flexible deformable membrane are tightly fitted to or permanently bonded to the walls of the first opening of the internal cavity, thereby forming a leak tight seal. The second cavity opening is slidably fitted with a back cover, arranged so that it can be manually pushed in and out. A squeezable and porous sponge is positioned within the internal cavity. The sponge rests in-between and is defined within the flexible deformable membrane and the slidable cover, respectively. The porous sponge contains a desired liquid gel of perfume or fragrance or other active compositions such as insect repellants, hair-conditioning products, dye compositions, moisturizing ingredients, antibacterial compounds, and the like. When hair or fur is brushed with the brush of the subject invention, the flexible membrane is deformed. This causes the sponge to be squeezed, and the liquid gel fragrance or perfume or other active composition is released to the hairs or fur of the coat being brushed through the fine apertures provided within the bristles transferring the liquid gel perfume, fragrance or active ingredient to hairs or fur of the coat during brushing. Application of additional pressure on the bristles during brushing instantly releases the liquid gel perfume, fragrance or active ingredient due to the squeezing action of the sponge.

Alternatively, the back cover, which is positioned over the second opening, may be manually pushed inwards towards the bristles, thereby squeezing the porous sponge and releasing the fragrance, or perfume and/or other active compositions through the apertures in the bristles fixed to the flexible deformable member. This method of releasing the liquid gel perfume, fragrance and/or active compositions does not require the bristles to be in contact with the hairs or fur of the coat being brushed, and can therefore be used to treat selected areas of coat prior to vigorous brushing.

The bristles with fine apertures may be attached to the flexible deformable membrane apertures in numerous ways. The bristles may be molded together by injection molding or similar processes with the deformable membrane, as a unitary body with the apertures in the flexible deformable membrane matching the central aperture in the bristle. In a second embodiment, the bristles may comprise apertures that are U shaped so that the aperture not only brings the liquid gel perfume, fragrance or active agent to the tip of the bristle, but also delivers along the length of the bristle. In this embodiment, the bristles deliver the liquid gel perfume, fragrance or active ingredient along its entire length and any hairs or fur of the coat contacting the bristle is coated with the liquid gel of fragrance, perfume or active ingredient.

The brush is assembled first by inserting the flexible, deformable membrane with brush elements having fine apertures attached thereto into the first opening of the internal cavity of the brush base. The deformable membrane is entirely contained within the first opening, wherein the perimeter of the membrane rests against the inner wall which is defined by the internal cavity. Next, the porous sponge that is saturated with the perfume or active compositions is inserted through the second opening and rests against the flexible deformable membrane. The back cover is now inserted over the second opening and rests against the porous sponge. When the sponge is exhausted, it is replaced by removing the back cover, removing the old sponge, and inserting a new porous sponge.

The porous sponge that contains liquid gel solution made up of perfume and/or other active compositions including insect repellant, hair-conditioning products, dye compositions, moisturizing ingredients, antibacterial compounds, animal health care products, grooming products, and the like is marketed as a replacement product. The porous sponge is sealed in a polymeric wrapper, and the user opens the sponge and inserts it into the internal cavity of the brush of the subject invention. Under normal use a fresh porous sponge lasts until the liquid gel is exhausted.

The bristles display a springy action first due to the flexible deformable membrane, which traps air within the internal cavity. The porous sponge also acts as a resilient member providing a cushioning action. Pushing the back cover in to release the liquid gel fragrance, perfume and/or other active composition is resisted by the flexible deformable membrane. The porous sponge behaves like a spring and returns the cover to the original position after release of the liquid gel fragrance, perfume and/or other active composition.

The liquid gel perfume, fragrance or active ingredient has a contact angle sufficiently low, typically in the range of 1 to 30 degrees with respect to the bristle material so that the liquid penetrates the fine apertures provided within the bristles. If the contact angle is significantly larger, the penetration of the liquid gel within the fine apertures of the bristle is compromised.

Significant advantages are realized by practice of the present invention. The key features of the direct application horse brush, include, in combination, the features set forth below:

1) a brush base has an internal cavity with a bottom surface having a first opening and top surface having a second opening, respectively;

2) the first opening is appointed to receive a flexible deformable membrane;

3) the second opening is appointed to receive a back cover;

3) the flexible deformable membrane has several rows of bristle elements with fine apertures provided therewithin;

4) a porous sponge saturated with liquid gel solution containing perfume, fragrance and/or other active compositions including insect repellants, hair-conditioning products, dye compositions, moisturizing ingredients, antibacterial compounds, and the like, is placed between the flexible deformable membrane and the back cover, respectively, within the internal cavity;

5) brushing action deforms the flexible deformable membrane, thereby squeezing the porous sponge and releasing to the brushed hair the liquid gel perfume, fragrance and/or other active compositions contained within the porous sponge, releasing the liquid gel through the fine bristle apertures that are open at the tip and optionally additionally open along the length of the bristle;

6) a user, at any time, may manually depress the back cover to squeeze the porous sponge, causing it to release the liquid gel perfume, fragrance and/or other active compositions contained within the porous sponge through the apertures in the bristles of the flexible deformable membrane; and 7) the user may periodically replace the sponge with a fresh sponge when the liquid gel perfume, fragrance and/or other active composition is exhausted;

whereby the user of the brush of the subject invention is provided with the capability to saturate the hairs or fur of the coat being brushed with a perfume, fragrance and/or other active compositions including insect repellant, hair conditioning products, dye compositions, moisturizing ingredients, antibacterial compounds, and the like.

BRIEF DESCRIPTION OF THE DRAWING

The invention will be more fully understood and further advantages will become apparent when reference is had to the following detailed description of the preferred embodiments of the invention and the accompanying drawings, in which:

FIG. 1b is a top plane view of the brush of this invention depicted in FIG. 1a;

FIG. 1c is a bottom plane view of the brush of this invention depicted in FIG. 1a;

DETAILED DESCRIPTION OF THE INVENTION

Figure 1A:
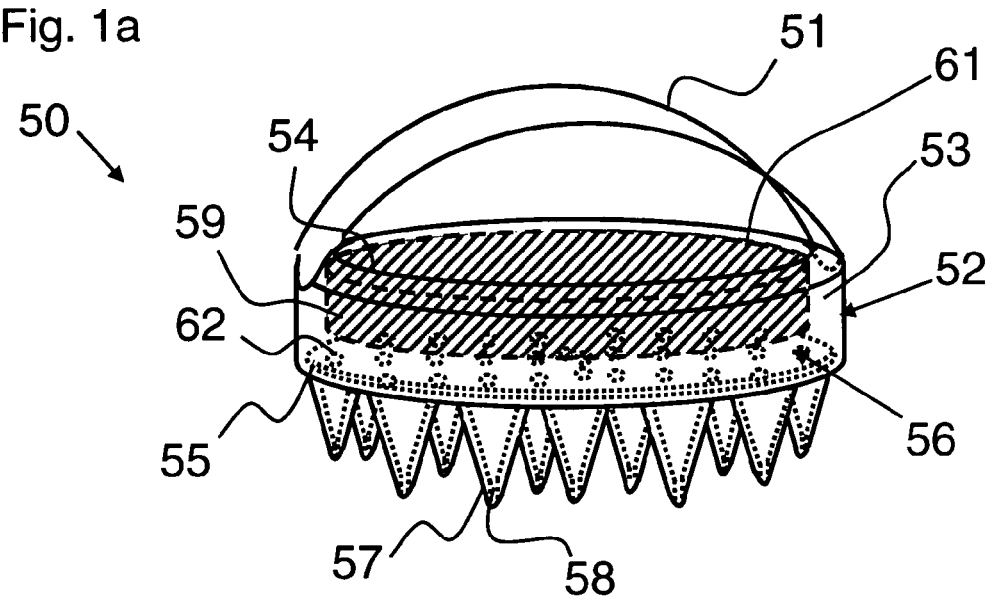
FIG. 1a is a side view depicting the brush of this invention, showing the brush base with the internal cavity, the flexible deformable membrane having brush elements with a central aperture, the porous sponge saturated with perfume, fragrance and/or other active compositions, the back cover, and the handle.

This invention relates to a brush for use with horses and livestock. The brush of the subject invention releases active compounds in substantially liquid form onto the fur, hair, mane, and coat of the horse and livestock, penetrating follicle depths. Active ingredients include fragrances, therapeutic or moisturizing compounds, hair-conditioning and detangle products, sun protection lotions, mane and tail whiteners and stain removers, dye compositions and other hair-related products, antibacterial compounds, flea and/or tic compounds, and insect repellant or the like. Direct delivery of the active compound onto the coat and mane of the animal provides optimal penetration and effectiveness of the product's treatment.

The present brush's application is particularly directed to use with livestock and barn animals such as horses, ponies, llamas, cattle and the like. These animals are oftentimes exposed to infection through parasites, such as ticks, and would benefit from a brush that provided a direct delivery system wherein the medicament can be delivered quickly and efficiently to the animal's skin, without having to be rubbed in through the animal's coat. Direct delivery of the active ingredients of the product to the animal's skin and interstitials of the hair or fur of the coat provides optimal application without loss due to run-off from upper surface applications of the product. As a result, exposure and contact of the active ingredients to the individual applying same is mitigated, while the delivery of the active ingredients is achieved in a highly efficient manner.

The brush is provided with a brush base that has an internal cavity with a bottom surface having a first opening and top surface having a second opening, respectively. The first opening receives a flexible deformable membrane which carries bristle elements having central apertures to release a liquid gel perfume, fragrance, and/or active compositions during brushing or at the desire of the user at any time. The flexible deformable membrane has a plurality of apertures within which bristles with central apertures are placed. Central apertures within the bristles provide a continuous liquid gel flow path. The first opening of the brush base receives the flexible deformable membrane with the bristles having a central aperture so that the bristles extend from the brush base. The perimeter of the flexible deformable membrane rests against the interior wall of the brush base defined by the internal cavity, thereby forming a leak tight seal. Preferably, the flexible deformable membrane is permanently bonded to the walls of the first opening of the brush base. A porous sponge saturated with liquid gel perfume, fragrance and/or other active compositions is placed within the internal cavity and rests on the flexible deformable membrane. A back cover is inserted through the second opening and rests against the sponge and forms a leak tight seal for the internal cavity.

Generally stated, the invention consists of a brush, which releases liquid gel fragrance, perfume and/or other active compositions during brushing or at any time by the user pressing the back cover. During the brushing action the bristles apply pressure against the central portion of the flexible deformable membrane, flattening the membrane configuration. This flattening action directly applies pressure on the porous sponge, which releases the liquid gel fragrance, perfume and/or other active compositions contained therein through the apertures of the bristles integrated within the flexible deformable membrane. Alternatively, the liquid gel fragrance, perfume and/or other active compositions may be released at will by manually depressing the back cover, which squeezes the porous sponge saturated with the liquid gel fragrance, perfume and/or other active composition.

The first opening may take any shape including elliptical, circular, rectangular, or square-shaped. The second opening may take any shape including elliptical, circular, rectangular, or square-shaped. The flexible, deformable membrane may take any shape including elliptical, circular, rectangular, or square-shaped. The porous sponge may take any shape including elliptical, circular, rectangular, or square-shaped. The back cover may take any shape including elliptical, circular, rectangular, or square-shaped. Any other suitable geometric shapes are within the scope of the present invention. Preferably, each of the first opening, second opening, flexible membrane, sponge, and back cover has the same general shape, respectively. At a minimum, all that is required is that, whatever its shape, the flexible deformable membrane and the cover form an air tight seal with the internal cavity so that the liquid gel perfume, fragrance and/or other active composition is released reliably.

The flexible deformable membrane is preferably made from rubber, typically with a thickness of 1/32 inch to 3/32 inch. The apertures provided for receiving the bristles are typically 0.010-0.60 inches, matching the outer diameter of the bristles used. The bristles are preferably polymeric bodies with a central aperture and a rounded end contacting hair. The bristles have a diameter ranging from 0.010 inch to 0.060 inches with central apertures having a diameter ranging from 0.005 inch to 0.040 inches. The bristles with a central aperture are preferably permanently bonded to the flexible deformable membrane apertures using glue or other attachment means, with the central aperture in the bristle matching that in the flexible deformable membrane so that a continuous liquid gel flow path is provided. Alternatively, the flexible deformable membrane and the bristles with the central aperture may be molded by an injection molding processes in one step to create a one piece unit which contains both the flexible deformable membrane and the bristles with central aperture.

In the second embodiment of the invention, each of the bristles not only has a central opening, but has a slit aperture along the length of the bristle. In other words, the bristle is U-shaped in its cross section and fits into or is bonded to the aperture in the flexible deformable membrane. In this arrangement, the liquid gel contained in the porous sponge is delivered to the hair that is being brushed both along the length of the bristle and its tip, providing more uniform distribution of the liquid gel contained within the porous sponge.

Since the liquid gel is released from the porous sponge and has to travel along the length of the bristle through the central aperture, it is important that the contact angle of the liquid gel with the bristle be in the range of 2 degrees to 30 degrees. If the contact angle exceeds this range, the liquid gel may not easily penetrate the central aperture and be delivered to the tip of the bristle in the first embodiment or to the tip and side surface of the bristle in the second embodiment.

Assembly of the brush of this invention comprises the steps of:

1. Arranging a flexible deformable membrane with a plurality of apertures adapted to receive and be attached to bristles with central apertures. The flexible deformable membrane is inserted through the first opening in the internal cavity of the brush base. Since the flexible deformable membrane has a slightly larger dimension than the first opening in the brush base, it must be flexed to insert the flexible deformable membrane. At this stage, the bristles with central aperture incorporated in the flexible deformable membrane point away from the internal cavity of the brush base. The perimeter of the flexible deformable membrane rests against the interior walls defined by the internal cavity, thereby forming an airtight seal. Alternatively, the flexible deformable membrane with attached bristles having a central aperture may be permanently bonded to the brush base.
2. The porous sponge saturated with liquid gel of fragrance, perfume and/or other active composition is now inserted from the second opening in the internal cavity of the brush base. The porous sponge is arranged so that it rests on the flexible deformable membrane, feeding the liquid gel to the aperture in the flexible deformable membrane and central apertures in the bristles.
3. The back cover is inserted over the second opening. This is a sliding fit providing a leak tight seal. The back cover rests against the porous sponge.
4. Now the assembled brush is ready to use. It delivers liquid gel perfume, fragrance and/or other active compositions contained within the sponge, when the brush is used to brush human or pet hair. Alternatively, the liquid gel fragrance, perfume and/or other active composition may be released at will by manually depressing the slidable back cover. Once the liquid gel perfume, fragrance and/or active composition is exhausted, the porous sponge is replaced with a fresh sponge by removing the back cover, discarding the used-up sponge, inserting a fresh sponge and re-inserting the back cover.

Plastic materials have particular application in manufacturing the subject brush, specifically including polyvinyl chloride (PVC) and acrylonitrile butadiene styrene (ABS). The size of the channel-like openings in the bristles could vary depending upon the viscosity of the liquid composition appointed for delivery. A vast array of animal health care products and compounds and solutions can be applied through use of the subject brush, such as those set forth in Table I hereinbelow.

TABLE I

| | |
|---|---|
| ULTRASHIELD ™ | Insecticide & Repellent |
| SUPERSHIELD RED ™ | Water-Resistant Fly Repellent |
| SUPERSHIELD GREEN ™ | Horse Spray, Herbal Gel & Super Concentrate |
| SHOWSHEEN ™ | Hair Polish & Detangler |
| ULTRASCREEN ™ | Maximum Sun Protection Lotion & Fade Protection |
| SUPERPOO & SHOWCLEAN ™ | Mane & Tail Whitener & Stain Remover |
| ABSORBINE ® | Varying Application; muscle, joint and arthritis pain reliever; |

FIG. 1a illustrates a side view of the brush for horses and livestock of the present invention, shown generally at 50. Brush 50 includes a handle 51 and brush base 52 having an internal cavity 53. The internal cavity 53 has a first opening 55 and a second opening 54. A flexible deformable membrane 56 with bristle elements 57 having apertures 58 is inserted within the first elliptical opening 55. Bristles elements 57 are herein shown having a cone shape, but bristle elements 57 may have an elongated rectangular or cylindrical shape (as is illustrated in FIGS. 2-5 hereinafter), or any suitable shape for combing between hairs or fur of the coat of an animal. Flexible deformable membrane 56 includes holes 62 interstitially therein which are in substantial proximity and alignment with bristles elements 57 and the apertures 58 thereof. A porous sponge 59 infused or saturated with liquid gel perfume, fragrance and/or other active composition is inserted above the flexible deformable membrane 56 within the internal cavity 53. The second opening 54 receives a back cover 61 with handle 51 attached thereto. Back cover 61 rests against the porous sponge 59.

Figure 1B:
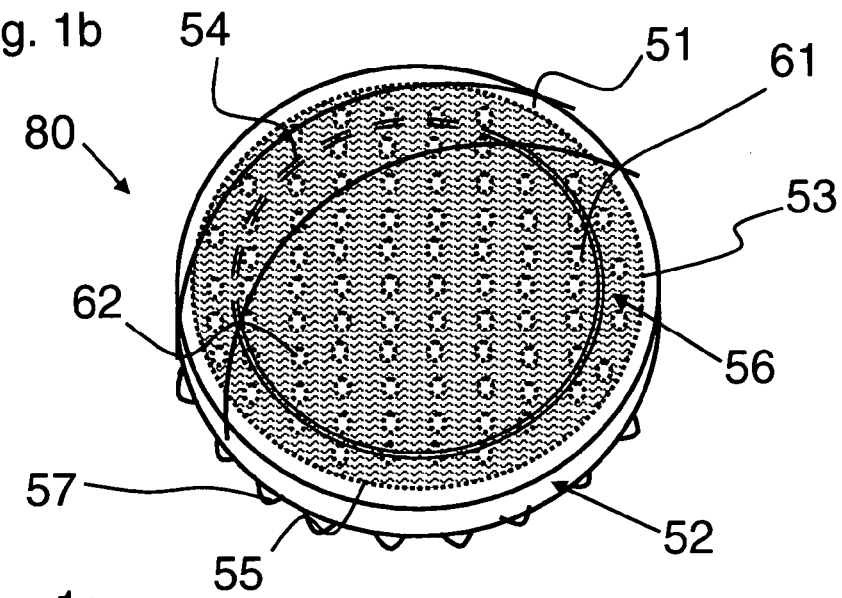
Figure 1C:
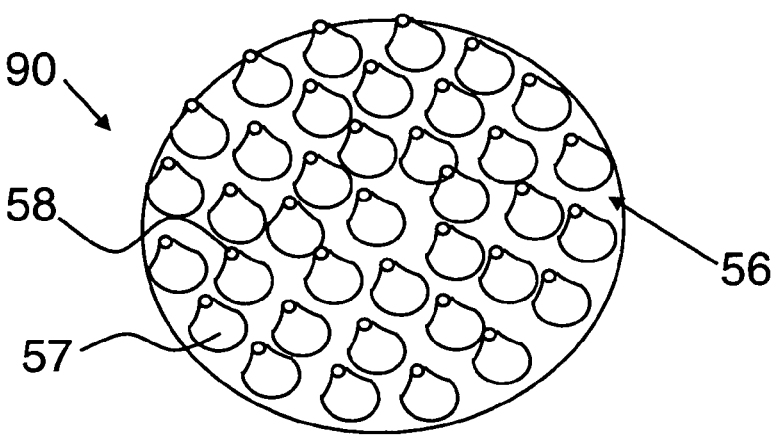

FIGS. 1b and 1c illustrate views of the brush for horses and livestock depicted in FIG. 1a: FIG. 1b illustrates a top plane view, shown generally at 80; and FIG. 1c illustrates a bottom plane view, shown generally at 90. Handle 51 extends over the brush base 52 of the brush. In operation, a user places their hand with the palm thereof facing downward toward brush base 52, while the top of the hand is in contact with handles 51. Brush base 52 is constructed with internal cavity 53 with first opening 55 and second opening 54. Second opening 55 accommodates flexible deformable membrane 56, which in turn holds bristle elements 57 having apertures 58 to form a substantially air tight seal. Flexible deformable membrane 56 includes holes 62 in substantial proximity and alignment with bristles elements 57 and the apertures 58 thereof. Alternatively, holes 62 of membrane 56 may include a plurality of holes, particularly when bristle elements 57 have a conical shape (as shown in FIGS. 1a-c), so that more than one hole 62 is in association with each bristle element 57 and the plurality of small holes 62 feed into or, alternatively, along the side of each bristle element 57. Porous sponge 59 is inserted above the flexible deformable membrane 56 within the internal cavity 53 and back cover 61 rests there against.

Figure 2:
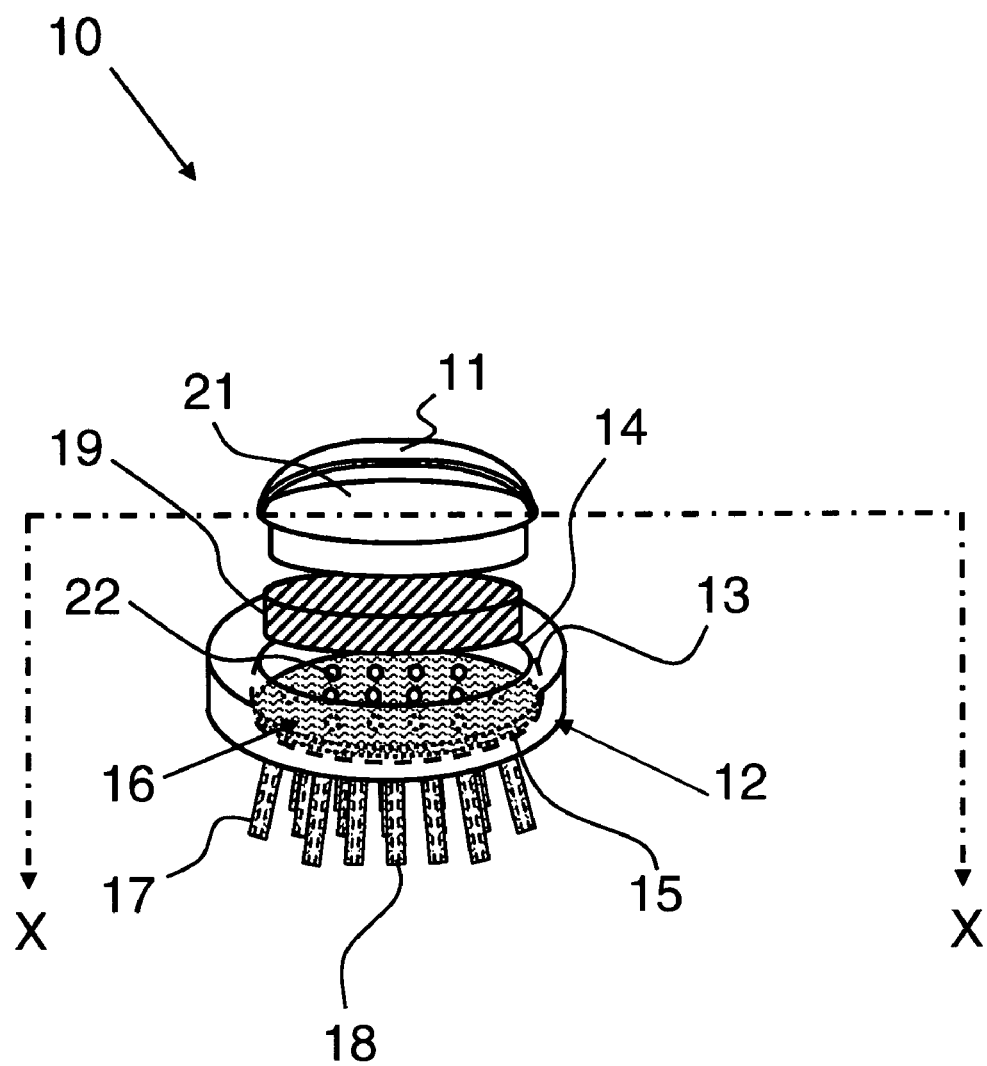
FIG. 2 is an illustration depicting the brush of this invention, showing the brush base, the internal cavity, the flexible deformable membrane having brush elements with a central aperture, the porous sponge saturated with perfume, fragrance and/or other active compositions, and the back cover.

FIG. 2 illustrates at 10 the brush for horses and livestock of the subject invention with a handle 11 and brush base 12 having an internal cavity 13. The internal cavity 13 has a first opening generally marked 15 and a second opening generally marked 14. A flexible deformable membrane 16 with bristle elements 17 having apertures 18 is inserted within the first elliptical opening 15. The bristle elements 17 are shown in cross section, for clarity, to illustrate the central aperture within the bristle. The apertures in the flexible deformable membrane 16 are shown at 22. A porous sponge 19 infused or saturated with liquid gel perfume, fragrance and/or other active composition is inserted above the flexible deformable membrane 16 within the internal cavity 13. The second opening 14 receives a back cover 21 with handle 11 attached thereto. Back cover 21 rests against the porous sponge 19.

Figure 3:
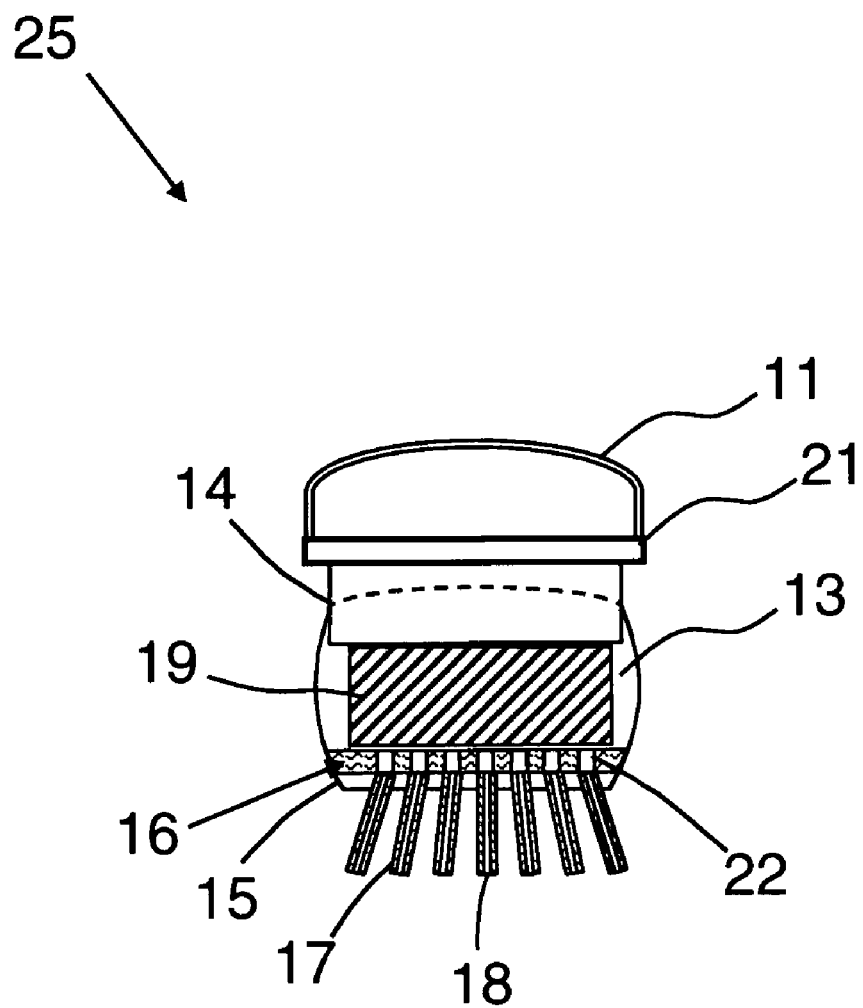
FIG. 3 is a cross section of the assembled brush of the subject invention taken along cross section XX of FIG. 1, showing the relative locations of the flexible deformable membrane with attached bristles having a central aperture, the porous sponge, and the back cover.

FIG. 3 illustrates a cross section of the assembled brush of the subject invention along cross section XX of FIG. 1, shown generally at 25. In its assembled configuration, the flexible deformable membrane 16 is entirely contained within the first opening 15. The flexible deformable membrane 16 is located against the inner wall defined by the internal cavity 13 so as to form a leak-tight seal or preferably bonded to the inner wall 13. Due to the larger dimension of the flexible deformable membrane 16, it protrudes from the first opening 15 with a convex bulge. The bristle elements 17 with apertures 18 are bonded to the flexible deformable membrane 16 so that bristle apertures line up, at least in part, with corresponding holes 22 in the flexible deformable membrane. Alternatively, the apertures 18 in the flexible deformable membrane 16 are disposed with respect to the brush bristles, so that the liquid passing through apertures 18 flows along the outsides of the brush bristles. When this brush is used, the bristle elements 17 with apertures 18 attached to the flexible deformable membrane 16 contact the hair, fur, or coat of the horse, pet or livestock first, thereby deforming the flexible deformable membrane 16. The porous sponge 19 with liquid gel perfume, fragrance and/or other active compositions is located in contact with the flexible deformable membrane 16. On the topside of the porous sponge there is the back cover 21, which is inserted through the second opening 14 forming a leak tight seal of the internal cavity. When the brush is used, pressure is applied to the flexible deformable membrane 16 which in turn squeezes the porous sponge 19, thereby releasing the liquid gel perfume, fragrance and/or other active composition incorporated in the sponge. The release occurs through a plurality of brush apertures 18 that are in line with the apertures 22 in the flexible deformable membrane 16. Alternatively, the liquid gel fragrance, perfume and/or other active composition may be released at any time by the user manually depressing the back cover 21, even when the brush is not brushing hair or fur. In still another embodiment of the brush, the apertures 18 are disposed such that liquid gel fragrance, perfume and/or other active composition, when released therethrough, flows along the outsides of the brush bristles.

Figure 4A:
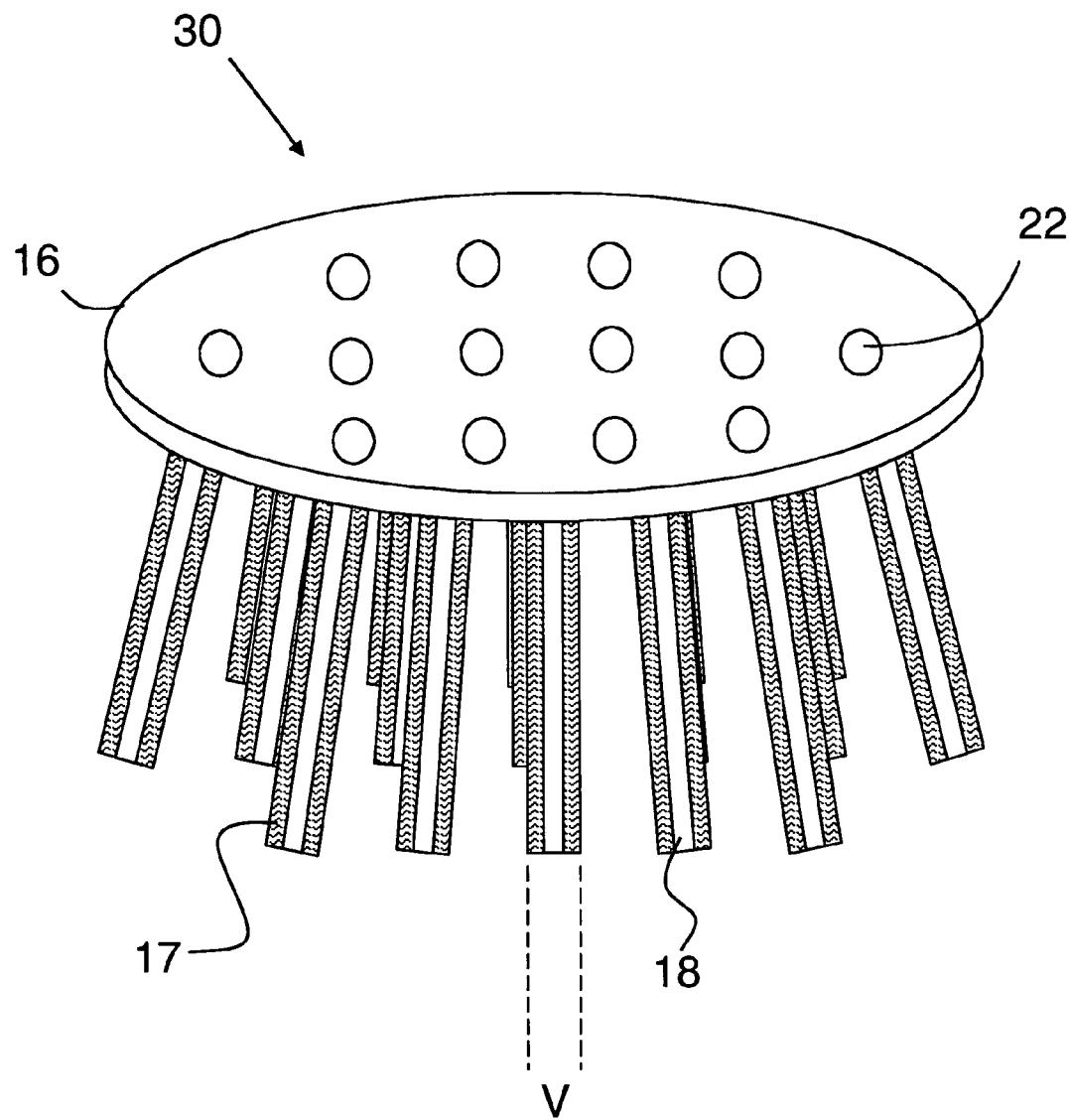
FIG. 4a is an illustration showing the flexible deformable membrane with attached bristles having a central aperture according to the first embodiment of the invention.
Figure 4B:
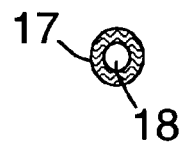
FIG. 4b shows the cross section of an individual bristle showing the central aperture.

FIG. 4a illustrates the flexible deformable membrane with bonded bristles 17, shown generally at 30. The flexible deformable membrane has apertures 22 which are matched with the apertures 18 in the bristles 17. In this figure, the bristles are shown in cross section to illustrate clearly the central aperture. FIG. 4b shows the cross section of the bristle showing the central aperture 18 within the bristle 17 taken along plan V of FIG. 4a.

Figure 5A:
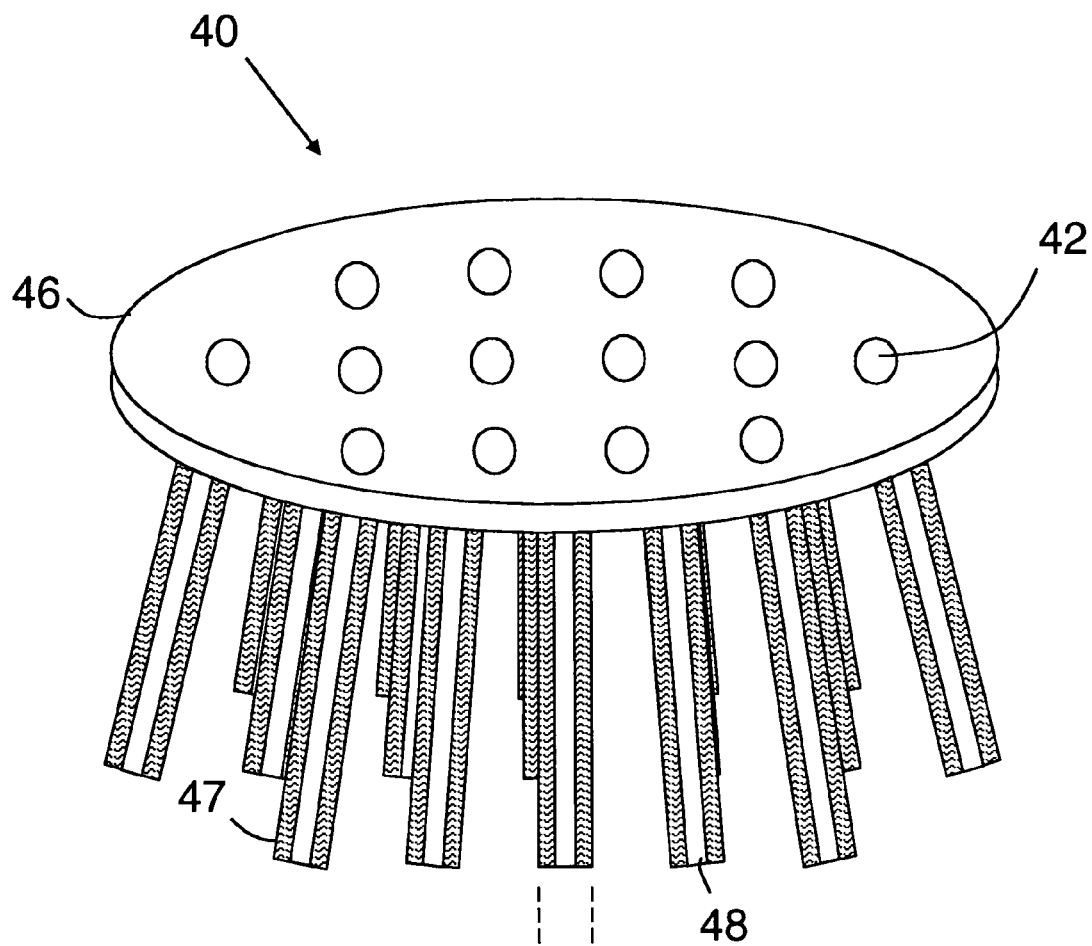
FIG. 5a is an illustration showing the flexible deformable membrane with attached bristles having a central aperture and having additional aperture openings along the length of the bristle according to the second embodiment of the invention.
Figure 5B:
FIG. 5b is a cross sectional view of an individual bristle showing the U shaped central aperture.

FIG. 5a illustrates the flexible deformable membrane with bonded bristles 47, shown generally at 40. The flexible deformable membrane has apertures 42 which are matched with U-shaped apertures 48 in the bristles 47. In this figure, the bristles are shown in cross section to illustrate clearly the central aperture. FIG. 5b shows the cross section of the bristle showing the central U-shaped aperture 48 within the bristle 47 taken along plan VI of FIG. 5a.

The brush 10 disclosed herein can be modified in numerous ways without departing from the scope of the invention. Porous sponge 19 can be replaced by a plastic silicon shell that encapsulates a liquid gel perfume, fragrance and/or other active compositions. These ingredients are released into canals within bristles 17 and/or flow along the sides of the bristles 17 upon application of pressure to flexible deformable membrane 16 or manual depression of back cover 21. An additional or reserve supply of liquid gel perfume, fragrance and/or other active compositions can be stored in one or more compartments within the interior of handle 11, and thereafter injected into contact with the flexible deformable membrane 16. The compartments can be replenished by pouring liquid gel perfume, fragrance and/or other active compositions therein through an optional sealable lid in back cover 20, or through an optional opening in the handle 11 which is normally sealed to the exterior but can be opened thereto by a removable cap. Replacement of contents within the optional compartment of handle 11 can alternatively be accomplished by insertion of injector cartridges containing the liquid gel perfume, fragrance and/or other active compositions. Such changes, modifications and alternative arrangements of the brush 10 are well within the ambit of the present invention.

Having thus described the invention in rather full detail, it will be understood that such detail need not be strictly adhered to, but that additional changes and modifications may suggest themselves to one skilled in the art, all falling within the scope of the invention as defined by the subjoined claims.

What is claimed is:

1. A direct application brush for horses and livestock, comprising:
   a. a molded brush base with a handle and an internal cavity with a bottom surface having a first opening and top surface having a second opening, respectively;
   b. a flexible deformable membrane disposed within said first opening, said flexible deformable membrane having apertures aligned with apertures in bristles of a brush fixedly attached thereto;
   c. a porous sponge saturated with liquid gel solution being placed over said flexible deformable membrane within said internal cavity;
   d. a cover having a top surface and a bottom surface, said cover being slidably fit within said second opening, wherein said cover presses against said porous sponge;
   whereby brushing hair with said brush deforms said flexible deformable membrane and squeezes said sponge, releasing said liquid gel solution saturated within said porous sponge through said apertures in said flexible deformable membrane and said bristles, and pressing the cover squeezes said porous sponge, releasing said liquid gel solution saturated within said porous sponge through said apertures in said flexible deformable membrane and bristles irregardless of whether said bristles of said brush are in contact with hair.

2. A brush as recited by claim 1, wherein each of said first and second openings is elliptical, said flexible deformable membrane is elliptical, and said cover is elliptical.

3. A brush as recited by claim 1, wherein each of said first and second openings is circular, said flexible deformable membrane is circular, and said cover is circular.

4. A brush as recited by claim 1, wherein each of said first and second openings is rectangular, said flexible deformable membrane is rectangular, and said cover is rectangular.

5. A brush as recited by claim 1, wherein each of said first and second openings is square-shaped, said flexible deformable membrane is square-shaped, and said cover is square-shaped.

6. A brush as recited by claim 1, wherein said flexible deformable membrane is composed of rubber having a thickness in the range of 1/32 inch to 3/32 inch.

7. A brush as recited by claim 1, wherein said flexible deformable membrane aperture has a diameter in the range of 0.010 inch to 0.060 inch.

8. A brush as recited by claim 1, wherein each of said bristles has a circular cross section, the diameter of which ranges from 0.010 to 0.060 inch.

9. A brush as recited by claim 1, wherein each of said bristles has a circular cross section, the diameter of which ranges from 0.005 inch to 0.040 inch.

10. A brush as recited by claim 9, wherein each of said bristles has a circular cross section with a central aperture and a slit along the length of the bristle forming a bristle having a U-shaped cross section.

11. A brush as recited by claim 1, wherein said flexible deformable membrane is composed of a flexible polymeric material having a thickness in the range of 1/32 inch to 3/32 inch.

12. A brush as recited by claim 1, wherein said liquid gel solution saturating said porous sponge includes active ingredients comprising grooming and cleaning products for a coat of said horse and livestock.

13. A brush as recited by claim 1, wherein said liquid gel solution saturating said porous sponge includes active ingredients comprising animal health care products.

14. A brush as recited by claim 1, wherein said liquid gel solution of said porous sponge is saturated with liquid gel perfume, fragrance and/or other active composition comprising insect repellant, flea repellants and treatments, tic repellant, mane and tail hair conditioning compositions, dye compositions, moisturizing ingredients, or antibacterial compounds.

15. A brush as recited by claim 1, wherein said liquid gel solution saturating said porous sponge consists of active ingredients selected from a group consisting of insect repellants, flea and/or tic compounds, muscle treatments, therapeutic or moisturizing compounds, or antibacterial compounds.

16. A brush as recited by claim 1, wherein said liquid gel solution saturating said porous sponge consists of active ingredients selected from a group consisting of perfumes, fragrance, hair-conditioning and detangle products, sun protection lotions, mane and tail whiteners and stain removers, dye compositions, fragrances or other hair/fur/coat-care related products.

17. A method for making a direct delivery brush for horses and livestock coats that releases a solution, comprising the steps of:
   a. forming a brush base having an internal cavity with a bottom surface having a first opening and top surface having a second opening;
   b. producing a flexible deformable membrane having apertures aligned with apertures in bristles rigidly attached thereto;
   c. inserting said flexible deformable membrane into said first opening in said internal cavity;
   d. inserting a porous sponge saturated with liquid gel solution through said second opening in said internal cavity, said porous sponge being in contact with said flexible deformable membrane;
   e. slidably inserting a cover through said second opening in said internal cavity, said cover being in contact with said porous sponge;
   whereby said flexible deformable membrane and slidable cover create a substantially leak-tight seal for said internal cavity in said brush base, and brushing hair or manually depressing said cover releases said liquid gel solution to said coat of said horse and livestock.

18. A method for making a direct delivery brush as recited by claim 1, wherein said liquid gel solution saturating said porous sponge comprises fragrance and/or other active composition comprising insect repellant, flea repellants and treatments, tic repellant, mane and tail hair conditioning compositions, dye compositions, moisturizing ingredients, or antibacterial compounds.

* * * * *